(12) United States Patent
Ji et al.

(10) Patent No.: US 10,459,953 B1
(45) Date of Patent: Oct. 29, 2019

(54) MEMBER PRIVACY PROTECTION

(71) Applicant: Microsoft Technology Licensing, LLC, Redmond, WA (US)

(72) Inventors: Haifeng Ji, San Jose, CA (US); Cory Scott, Saratoga, CA (US); Theodore Hwa, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 140 days.

(21) Appl. No.: 15/669,021

(22) Filed: Aug. 4, 2017

(51) Int. Cl.
| | |
|---|---|
| *G06Q 50/00* | (2012.01) |
| *G06F 16/28* | (2019.01) |
| *H04L 12/24* | (2006.01) |
| *G06F 16/2457* | (2019.01) |

(52) U.S. Cl.
CPC ...... *G06F 16/285* (2019.01); *G06F 16/24575* (2019.01); *G06Q 50/01* (2013.01); *H04L 41/00* (2013.01)

(58) Field of Classification Search
CPC .. G06F 16/285; G06F 16/24575; F06Q 50/01; H04L 41/00
USPC ......................................................... 709/206
See application file for complete search history.

(56) References Cited

U.S. PATENT DOCUMENTS

| | | | | |
|---|---|---|---|---|
| 7,519,708 B2 * | 4/2009 | Malik | ..................... | G06Q 10/00 709/206 |
| 8,156,098 B1 * | 4/2012 | Landsman | ............. | G06Q 30/00 707/706 |
| 8,214,301 B2 * | 7/2012 | Samuel | .................. | G06Q 10/06 705/319 |
| 8,874,727 B2 * | 10/2014 | Swahar | .................. | G06Q 10/10 709/224 |
| 9,154,575 B2 * | 10/2015 | Harik | ..................... | H04L 67/306 |
| 9,230,240 B2 * | 1/2016 | Iwasaki | ................. | G06Q 10/10 |
| 9,535,944 B2 * | 1/2017 | Hudack | ................. | H04L 67/306 |
| 2008/0127318 A1 * | 5/2008 | Adler | .................... | G06Q 10/107 726/7 |
| 2009/0070684 A1 * | 3/2009 | Aldrich | ................. | G06Q 10/10 715/743 |
| 2009/0265198 A1 * | 10/2009 | Lester | ................ | G06Q 30/0185 705/318 |
| 2009/0319288 A1 * | 12/2009 | Slaney | .................. | G06Q 10/10 705/1.1 |

(Continued)

*Primary Examiner* — Glenford J Madamba
(74) *Attorney, Agent, or Firm* — Schwegman Lundberg & Woessner, P.A.

(57) ABSTRACT

A system and method for identifying potential member and guest contacts while protecting member data privacy at a social networking system are disclosed. A system stores contact information for a plurality of members of a social networking system. The system receives a list of contacts of the first member. For a contact, the system accesses contact information of the contact, compares the contact information in the contact to contact information for the plurality of members, and in accordance with a determination that the contact information in the contact matches the contact information of a member of the social networking system, generates a score that the contact is not associated with malicious activity. In accordance with a determination that the generated score exceeds a predetermined score threshold, the system categorizes the contact as a suggested member connection. The system transmits member referral data to the client device for presentation.

20 Claims, 11 Drawing Sheets

(56) References Cited

U.S. PATENT DOCUMENTS

| | | | |
|---|---|---|---|
| 2010/0325218 A1* | 12/2010 | Castro | G06Q 10/10 |
| | | | 709/206 |
| 2011/0289153 A1* | 11/2011 | Hull | G06Q 10/107 |
| | | | 709/205 |
| 2012/0246720 A1* | 9/2012 | Xie | H04L 63/145 |
| | | | 726/22 |
| 2013/0091280 A1* | 4/2013 | Rajakarunanayake | |
| | | | G06Q 50/01 |
| | | | 709/225 |
| 2013/0290451 A1* | 10/2013 | Harik | H04L 51/12 |
| | | | 709/206 |
| 2014/0222821 A1* | 8/2014 | Kelmenson | G06Q 50/01 |
| | | | 707/740 |
| 2015/0248736 A1* | 9/2015 | Myslinski | G06Q 50/01 |
| | | | 705/319 |
| 2015/0347785 A1* | 12/2015 | Bennett | H04W 4/21 |
| | | | 726/28 |
| 2016/0179819 A1* | 6/2016 | Narayanan | H04W 4/21 |
| | | | 707/728 |

* cited by examiner

MEMBER PRIVACY PROTECTION

TECHNICAL FIELD

The disclosed example embodiments relate generally to the field of social networking and, in particular, to maintaining member privacy while allowing members to import contacts to build their social graph.

BACKGROUND

The rise of the computer age has resulted in increased access to personalized services online. As the cost of electronics and networking services drop, many services that were previously provided in person are now provided remotely over the Internet. For example, entertainment has increasingly shifted to the online space with companies such as Netflix and Amazon streaming TV shows and movies to members at home. Similarly, electronic mail (e-mail) has reduced the need for letters to physically be delivered. Instead, messages are sent over networked systems almost instantly. Similarly, online social networking sites allow members to build and maintain personal and business relationships in a much more comprehensive and manageable manner.

Consequently, the number of different social networks and the amount which they are used in every facet of daily life has increased significantly. These social networks collect and organize data about their members' social lives and then are able to track the social graphs (e.g., social connections amongst members) for large groups of members. Generally, social networks with more members and more social data provide more benefits to their members than social networks with fewer members and less data. Thus, established social networks typically have more members and social graph data, which can potentially make them more useful than newly created competitor social networks.

One way to grow social networks is to import contacts from a list of contacts that the member has in another context (e.g., phone contacts, email contacts, contacts from another social network). However, any system that maps information submitted by a member with member profile information needs to protect the privacy of the members.

It is within this context that the present disclosure arises.

DESCRIPTION OF THE DRAWINGS

Some example embodiments are illustrated by way of example and not limitation in the figures of the accompanying drawings.

Like reference numerals refer to corresponding parts throughout the drawings.

DETAILED DESCRIPTION

Figure 1:
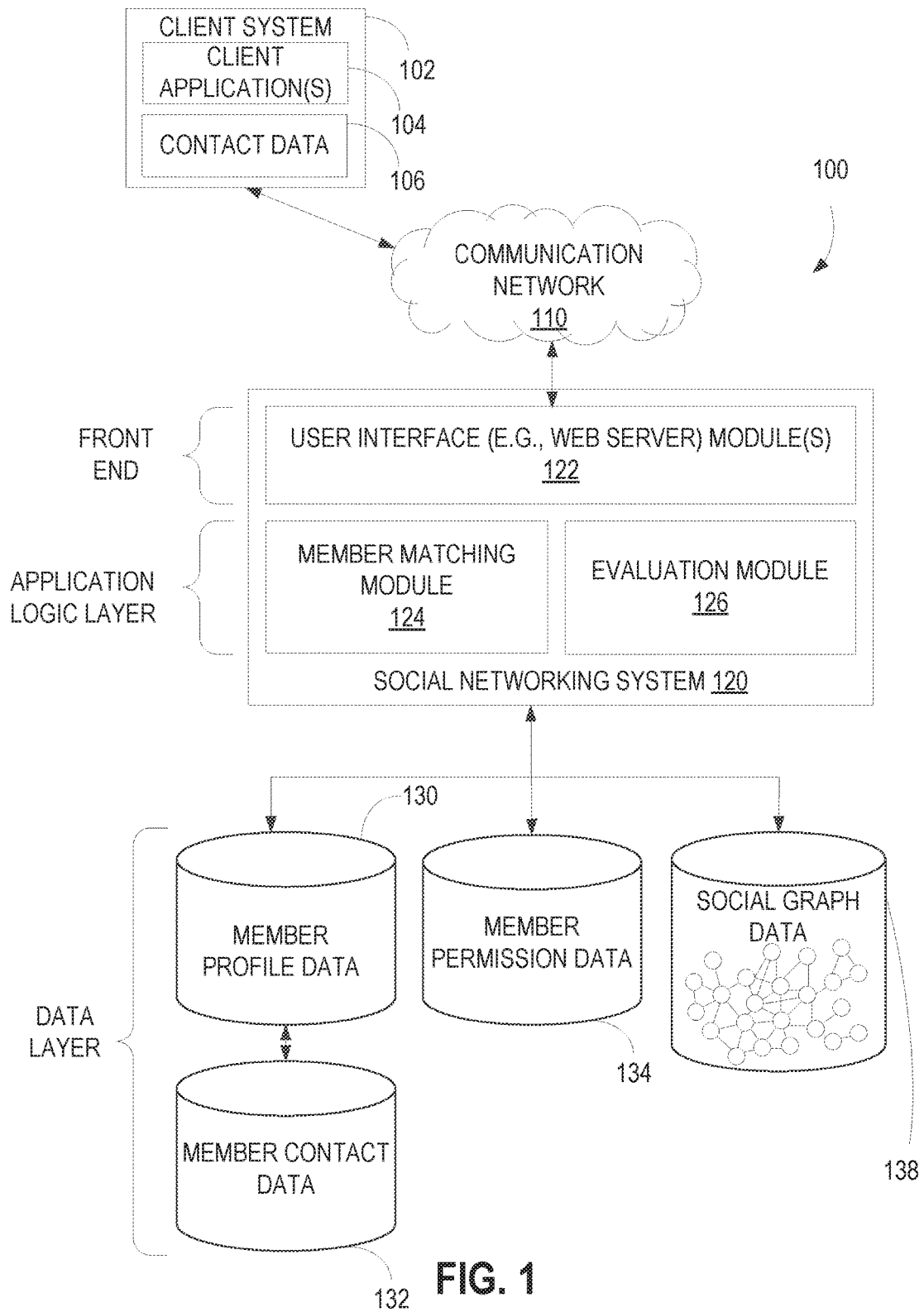
FIG. 1 is a network diagram depicting a client-server system that includes various functional components of a social networking system, in accordance with some example embodiments.

The present disclosure describes methods, systems, and computer program products for protecting the privacy of member information while performing member finding functions. In the following description, for purposes of explanation, numerous specific details are set forth to provide a thorough understanding of the various aspects of different example embodiments. It will be evident, however, to one skilled in the art, that any particular example embodiment may be practiced without all of the specific details and/or with variations, permutations, and combinations of the various features and elements described herein.

In some example embodiments, a social networking system has a plurality of members. Each member has an associated member profile. The member profile for each member includes, among other things, a social graph that records the connections that the member has with other members of the social networking system. When a member seeks to connect with additional members, the member can submit a contact list, the contact list including at least one piece of member-identifiable information (e.g., name, email address, phone number, member identification number for a different social networking system, and so on).

In some example embodiments, the social networking system can match the received list of contacts to determine whether any of the imported contacts match current members of the social networking system. This matching is done by matching the member-identifiable information that is included in the contact with the member profile data for members of the social networking system (if the member has affirmatively allowed such matching to take place). Then, with the member's permission, the matching members can be displayed to the member who submitted the list of contacts so that they get an opportunity to connect on the social networking system. Any contacts that do not match an existing member can be displayed as guest contacts with an option to invite them to the social networking system.

However, such contact matching, even if agreed to by the member, can result in unintended privacy breaches. For example, if someone wishes to identify a phone number for a member, the person can submit a list of possible phone numbers and see which matches the target member. In order to prevent abuses of the matching system, the social networking system takes steps to evaluate contact list submissions and only provides member match data for submissions that meet predetermined characteristics.

In some example embodiments, the process for evaluating contact list information includes receiving a list of contacts from a member of the social networking system, wherein the contact list includes member-identifiable contact information for at least one individual. Member-identifiable contact information includes any piece of contact information that can identify a particular member, including an email address, a phone number (often combined with all or part of a name), a membership identification number for another web service, and so on.

For each contact in the submitted contact list, the social networking system calculates a confidence score, wherein the confidence score represents the likelihood that the contact is a legitimate request for which matching should be done. This confidence score may also be terms a likelihood score, with the likelihood being that the contact list is not malicious. In some example embodiments, factors considered in determining whether a contact or list of contacts is considered a legitimate request include, but are not limited to, the number of contacts, whether a name associated with the contact matches the recorded name for that member (or the total percentage of contacts in a received contact list that have a matching name), the rate at which contacts have been submitted, and so on.

In some example embodiments, the social networking system uses the member-identifiable contact information included with a particular contact to determine whether there is a current matching member of the social networking system. If there is a matching member, and the determined confidence score exceeds a predetermined threshold, the matching member will be presented to the member who supplied the contact list. If there is no matching member, or the member has not opted into allowing such contact matching, or the confidence score of the contact is lower than a threshold, the contact will be displayed as a guest, with an option for the member to invite that guest to join the social networking system (without any information displayed, other than the information supplied in the contact list, so as not to violate any member's privacy). By configuring privacy controls or settings as they desire, members of a social networking system, or other user community that may use or interact with embodiments described herein, can control or restrict the information that is collected from them, the information that is provided to them, their interactions with such information and with other members, and/or how such information is used. Implementation of these embodiments is not intended to supersede or interfere with the members' privacy settings, and is implemented to be compliant with all applicable privacy laws and regulations.

FIG. 1 is a network diagram depicting a client-server system environment 100 that includes various functional components of a social networking system 120, in accordance with some example embodiments. The client-server system environment 100 includes one or more client systems 102 and the social networking system 120. One or more communication networks 110 interconnect these components. The communication networks 110 may be any of a variety of network types, including local area networks (LANs), wide area networks (WANs), wireless networks, wired networks, the Internet, personal area networks (PANs), or a combination of such networks.

In some example embodiments, the client system 102 is an electronic device, such as a personal computer (PC), a laptop, a smartphone, a tablet, a mobile phone, or any other electronic device capable of communication with the communication network 110. The client system 102 includes one or more client applications 104, which are executed by the client system 102. In some example embodiments, the client application(s) 104 include one or more applications from a set consisting of search applications, communication applications, productivity applications, game applications, word processing applications, or any other useful applications. The client application(s) 104 include a web browser. The client system 102 uses a web browser to send and receive requests to and from the social networking system 120 and to display information received from the social networking system 120.

In some example embodiments, the client system 102 includes an application specifically customized for communication with the social networking system 120 (e.g., a LinkedIn iPhone application). In some example embodiments, the social networking system 120 is a server system that is associated with one or more services.

In some example embodiments, the client system 102 includes contact data 106 associated with the member who uses the client system 102. Contact data 106 includes member-identifiable contact information for one or more members. Member-identifiable contact information includes any information that can be used to identify a specific member of the social networking system 120, including phone numbers, addresses, email addresses, identification numbers (either for a government based system or another online service), and so on. In some example embodiments, a name is associated with each contact.

In some example embodiments, the client system 102 sends a list of contacts to the social networking system 120 to enable the social networking system 120 to identify which, if any, of those contacts are already members of the social networking system 120 and to allow the submitting member to invite them to join his or her social graph. For example, a member of the social networking system 120 uses the client system 102 to log into the social networking system 120 and submit a list of contacts. In response, the client system 102 receives a list of current members who match the submitted contacts (if the members in question have opted to allow it) and a list of guests (who are not already members) that the member can invite to connect with him or her and be included in the member's social graph data. That information is displayed at a display associated with the client system 102.

In some example embodiments, as shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid unnecessary detail, various functional modules and engines that are not germane to conveying an understanding of the various example embodiments have been omitted from FIG. 1. However, a skilled artisan will readily recognize that various additional functional modules and engines may be used with a social networking system 120, such as that illustrated in FIG. 1, to facilitate additional functionality that is not specifically described herein. Furthermore, the various functional modules and engines depicted in FIG. 1 may reside on a single server computer or may be distributed across several server computers in various arrangements. Moreover, although the social networking system 120 is depicted in FIG. 1 as having a three-tiered architecture, the various example embodiments are by no means limited to this architecture.

As shown in FIG. 1, the front end consists of a user interface module(s) (e.g., a web server) 122, which receives requests from various client systems 102 and communicates appropriate responses to the requesting client systems 102. For example, the user interface module(s) 122 may receive requests in the form of Hypertext Transfer Protocol (HTTP) requests, or other web-based, application programming interface (API) requests. The client system 102 may be executing conventional web browser applications or applications that have been developed for a specific platform to include any of a wide variety of mobile devices and operating systems.

As shown in FIG. 1, the data layer includes several databases, including databases for storing data for various members of the social networking system 120, including member profile data 130, member permission data 134, and social graph data 138, which is data stored in a particular type of database that uses graph structures with nodes, edges, and properties to represent and store data. Of course, in various alternative example embodiments, any number of other entities might be included in the social graph (e.g., companies, organizations, schools and universities, religious groups, non-profit organizations, governmental organizations, non-government organizations (NGOs), and any other group) and, as such, various other databases may be used to store data corresponding with other entities.

Consistent with some example embodiments, when a person initially registers to become a member of the social networking system 120, the person will be prompted to provide some personal information, such as his or her name, contact information, home town, address, educational background (e.g., schools, majors, etc.), current job title, job description, industry, employment history, skills, professional organizations, memberships with other online service systems, and so on. This information is stored, for example, in the member profile data 130.

In some example embodiments, the member profile data 130 also includes member contact data 132 as either a subsection of the member profile data 130 or a connected database. The member contact data 132 includes information including, but not limited to, the member's email address, the member's member identification number (for the social networking system 120 or another system), the member's phone number, and so on.

In some example embodiments, member permission data 134 includes, for members of the social networking system 120, data describing the ways in which the member has allowed the social networking system 120 to use the member's data. For example, member permission data 134 can include information outlining which data is publicly available (e.g., for recruiters and so on), which data is limited to social connections, and which data is totally private. In another example, the member permission data 134 determines whether a given member can be matched to a submitted contact list.

Once registered, a member may invite other members, or be invited by other members, to connect via the social networking system 120. A "connection" may include a bilateral agreement by the members, such that both members acknowledge the establishment of the connection. Similarly, in some example embodiments, a member may elect to "follow" another member. In contrast to establishing a "connection," the concept of "following" another member typically is a unilateral operation and, at least in some example embodiments, does not include acknowledgement or approval by the member that is being followed. When one member follows another, the member who is following may receive automatic notifications about various interactions undertaken by the member being followed. In addition to following another member, a member may elect to follow a company, a topic, a conversation, or some other entity, which may or may not be included in the social graph. Various other types of relationships may exist between different entities, and are represented in the social graph data 138.

The social networking system 120 may provide a broad range of other applications and services that allow members the opportunity to share and receive information, often customized to the interests of the member. In some example embodiments, the social networking system 120 may include a photo sharing application that allows members to upload and share photos with other members. As such, at least in some example embodiments, a photograph may be a property or entity included within a social graph. In some example embodiments, members of the social networking system 120 may be able to self-organize into groups, or interest groups, around a subject matter or topic of interest. In some example embodiments, the data for a group may be stored in a database. When a member joins a group, his or her membership in the group will be reflected in the member profile data 130 and the social graph data 138.

In some example embodiments, the application logic layer includes various application server modules, which, in conjunction with the user interface module(s) 122, generate various user interfaces (e.g., web pages) with data retrieved from various data sources in the data layer. In some example embodiments, individual application server modules are used to implement the functionality associated with various applications, services, and features of the social networking system 120. For instance, a messaging application, such as an email application, an instant messaging application, or some hybrid or variation of the two, may be implemented with one or more application server modules. Similarly, a search engine enabling members to search for and browse member profiles may be implemented with one or more application server modules.

A member matching module 124 or an evaluation module 126 can also be included in the application logic layer. Of course, other applications or services that utilize the member matching module 124 and the evaluation module 126 may be separately implemented in their own application server modules.

As illustrated in FIG. 1, in some example embodiments, the member matching module 124 and the evaluation module 126 are implemented as services that operate in conjunction with various application server modules. For instance, any number of individual application server modules can invoke the functionality of the member matching module 124 and the evaluation module 126. However, in various alternative example embodiments, the member matching module 124 and the evaluation module 126 may be implemented as their own application server modules such that they operate as standalone applications.

Generally, the member matching module 124 receives a list of contacts from a member of the social networking system 120 (e.g., a new member joins the social networking system 120 and submits their existing contact list to grow their social graph). The member matching module 124 then uses member-identifiable contact information (e.g., email address, phone number, and so on as described above).

The member matching module 124 determines whether any members of the social networking system 120 have member-identifiable contact information that matches the member-identifiable contact information in the list of contacts. If so, the member matching module 124 determines whether the matching member has opted to allow such matching to be presented to another member.

In some example embodiments, the member matching module 124 also compares supplemental information (e.g., information that does not necessarily identify a particular individual, like a name) associated with the contact list (e.g., names, locations) to determine whether those details also match the member who matches the member-identifiable contact information. For example, if a phone number submitted by a member matches the phone number of a particular member, the member matching module 124 also compares the name listed in the submitted contact to the name of the particular member. If the names do not match, or are not within predetermined matching tolerances, the member matching module 124 will not consider the member to match the phone number.

The evaluation module 126 generates a confidence score for a submitted contact, or list of contacts, that the submitted contact is legitimate. In this case, a legitimate submitted contact is one that is an actual contact listing from a genuine member of the social networking system 120 seeking to connect with contacts that they have outside of the social networking system 120. In contrast, a non-legitimate contact submission is one that is determined by the evaluation module 126 to be an attempt to access member information which the submitting member does not have access to. For example, a member who knows the area in which a particular member lives, but not the particular member's phone number, may submit a list of many possible numbers, seeking for the social networking system 120 to identify the correct number. Thus, that contact submission would be determined to be non-legitimate.

The evaluation module 126 generates confidence scores based on a number of factors. For example, the evaluation module 126 measures the number of contacts submitted by a particular member. If that number is over a particular value, the confidence score will be reduced. Similarly, the evaluation module 126 can measure the number of contacts with names that match the corresponding names in member profiles. The social networking system 120 uses this information to generate confidence scores.

Figure 2:
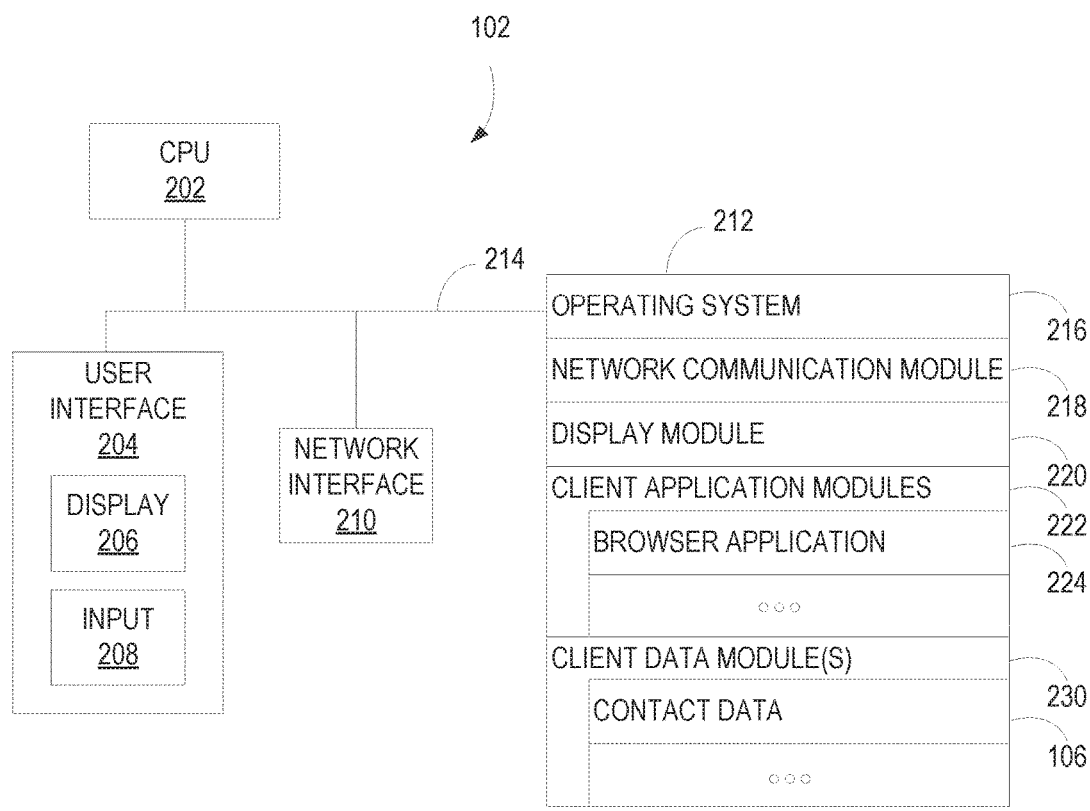
FIG. 2 is a block diagram illustrating a client system, in accordance with some example embodiments.

FIG. 2 is a block diagram further illustrating the client system 102, in accordance with some example embodiments. The client system 102 typically includes one or more central processing units (CPUs) 202, one or more network interfaces 210, memory 212, and one or more communication buses 214 for interconnecting these components. The client system 102 includes a user interface 204. The user interface 204 includes a display device 206 and optionally includes an input means 208 such as a keyboard, a mouse, a touch-sensitive display, or other input buttons. Furthermore, some client systems 102 use a microphone and voice recognition to supplement or replace the keyboard.

The memory 212 includes high-speed random-access memory, such as dynamic random-access memory (DRAM), static random-access memory (SRAM), double data rate random-access memory (DDR RAM), or other random-access solid state memory devices; and may include non-volatile memory, such as one or more magnetic disk storage devices, optical disk storage devices, flash memory devices, or other non-volatile solid state storage devices. The memory 212 may optionally include one or more storage devices remotely located from the CPU(s) 202. The memory 212, or alternatively, the non-volatile memory device(s) within the memory 212, comprise(s) a non-transitory computer-readable storage medium.

In some example embodiments, the memory 212, or the computer-readable storage medium of the memory 212, stores the following programs, modules, and data structures, or a subset thereof:
- an operating system 216 that includes procedures for handling various basic system services and for performing hardware-dependent tasks;
- a network communication module 218 that is used for connecting the client system 102 to other computers via the one or more network interfaces 210 (wired or wireless) and one or more communication networks 110, such as the Internet, other WANs, LANs, metropolitan area networks (MANs), etc.;
- a display module 220 for enabling the information generated by the operating system 216 and client application(s) 104 to be presented visually on the display device 206;
- one or more client applications 104 for handling various aspects of interacting with the social networking system (e.g., system 120 in FIG. 1), including but not limited to:
  - a browser application 224 for requesting information from the social networking system 120 (e.g., connection suggestion) and receiving responses from the social networking system 120; and
- client data module(s) 230 for storing data relevant to clients, including but not limited to:
  - contact data 106 for storing a list of contact information for the member who owns or is otherwise associated with the client system 102.

Figure 3:
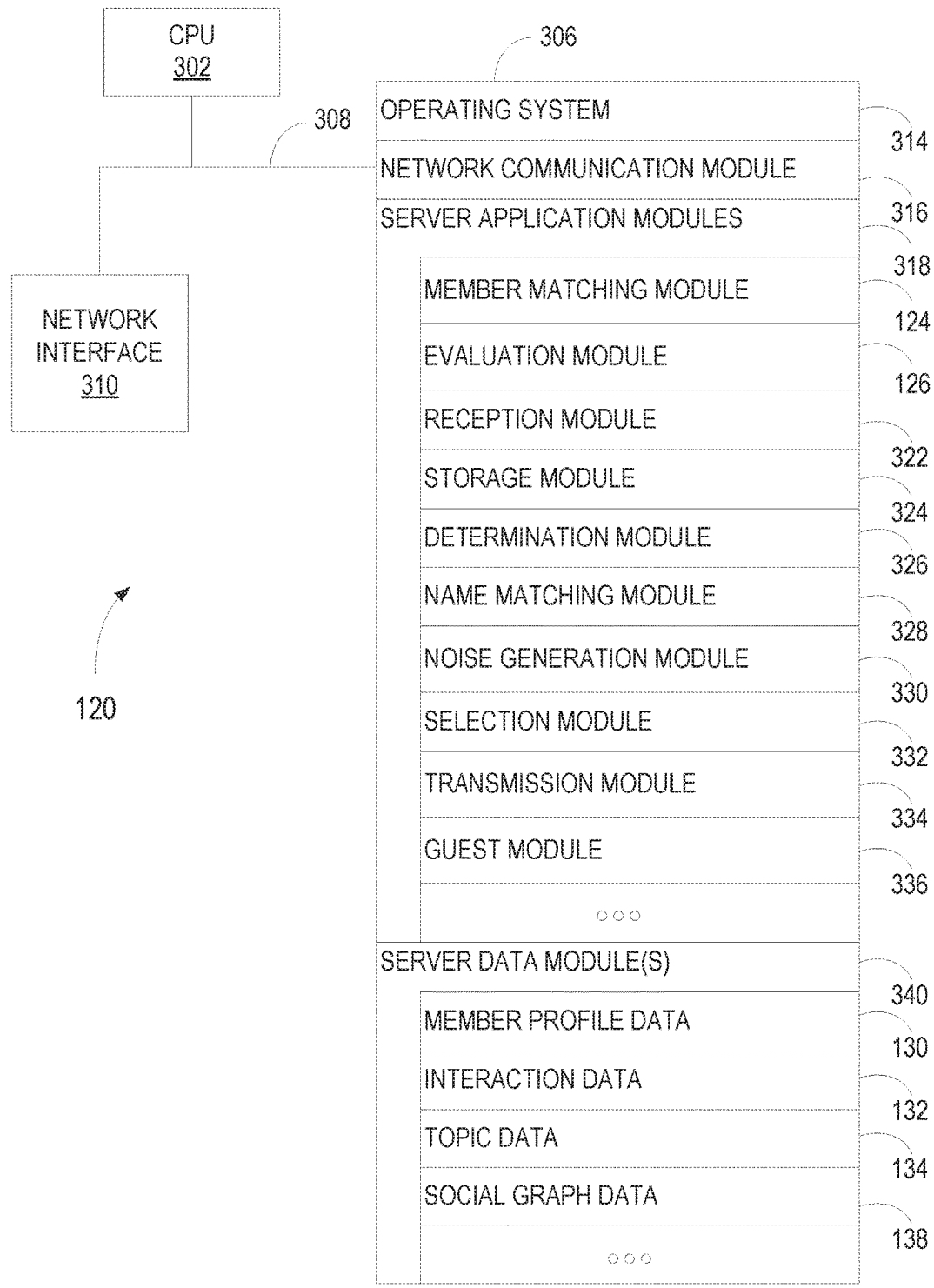
FIG. 3 is a block diagram illustrating a social networking system, in accordance with some example embodiments.

FIG. 3 is a block diagram further illustrating the social networking system 120, in accordance with some example embodiments. Thus, FIG. 3 is an example embodiment of the social networking system 120 in FIG. 1. The social networking system 120 typically includes one or more CPUs 302, one or more network interfaces 310, memory 306, and one or more communication buses 308 for interconnecting these components. The memory 306 includes high-speed random-access memory, such as DRAM, SRAM, DDR RAM, or other random-access solid state memory devices; and may include non-volatile memory, such as one or more magnetic disk storage devices, optical disk storage devices, flash memory devices, or other non-volatile solid state storage devices. The memory 306 may optionally include one or more storage devices remotely located from the CPU(s) 302.

The memory 306, or alternatively the non-volatile memory device(s) within the memory 306, comprises a non-transitory computer-readable storage medium. In some example embodiments, the memory 306, or the computer-readable storage medium of the memory 306, stores the following programs, modules, and data structures, or a subset thereof:
- an operating system 314 that includes procedures for handling various basic system services and for performing hardware-dependent tasks;
- a network communication module 316 that is used for connecting the social networking system 120 to other computers via the one or more network interfaces 310 (wired or wireless) and one or more communication networks 110, such as the Internet, other WANs, LANs, MANs, and so on;
- one or more server application modules 318 for performing the services offered by the social networking system 120, including but not limited to:
  - a member matching module 124 for matching member-identifiable contact data in a list of submitted contacts received from a submitting member;
  - an evaluation module 126 for determining a likelihood that a given contact or group of contacts is legitimate;
  - a reception module 322 for receiving a list of contacts from a member;

a storage module 324 for storing member contact data 132 for each member of the social networking system 120, including but not limited to email addresses, phone numbers, physical addresses, member identification numbers for the social networking system 120 or other online services, and so on;

a determination module 326 for determining whether a particular contact received from a member matches any specific member of the social networking system 120 based on member-identifiable contact information in the particular contact;

a name matching module 328 for determining whether a name listed in a contact record matches the name of the potential member within a predetermined amount of tolerance (e.g., calculating a distance between the name in the contact record and the name of the member and evaluating whether it is within a certain threshold);

a noise generation module 330 for selecting at least a small number (configurable) of matching members (e.g., members who matched particular contact records) and presenting those members as guests, such that at least some noise is presented in member and guest presentations;

a selection module 332 for selecting one or more members that match contact records for transmission to a client system (e.g., client system 102 in FIG. 1);

a transmission module 334 for transmitting one or more member confirmation notices or guest confirmation notices to a client system (e.g., the client system 102 in FIG. 1) for display; and a guest module 336 for transmitting a request to a guest to join the social networking system 120 in response to a member's prompt; and server data module(s) 340, holding data related to the social networking system 120, including but not limited to:

member profile data 130, including both data provided by the member, who will be prompted to provide some personal information, such as his or her name, age (e.g., birth date), gender, interests, contact information, home town, address, educational background, schools, majors, etc.), current job title, job description, industry, employment history, skills, professional organizations, memberships to other social networks, customers, past business relationships, and seller preferences; and inferred member information based on the member's activity, social graph data 138, overall trend data for the social networking system 120, and so on;

member contact data 132 including data detailing how the member can be contacted (e.g., email address, phone number, messaging app number or name, and so on);

member permission data 134 including data that outlines what permissions the member has given to the social networking system 120 including whether or not that member can be matched against important contact lists from other members; and social graph data 138 including data that represents members of the social networking system 120 and the social connections between them.

Figure 4:
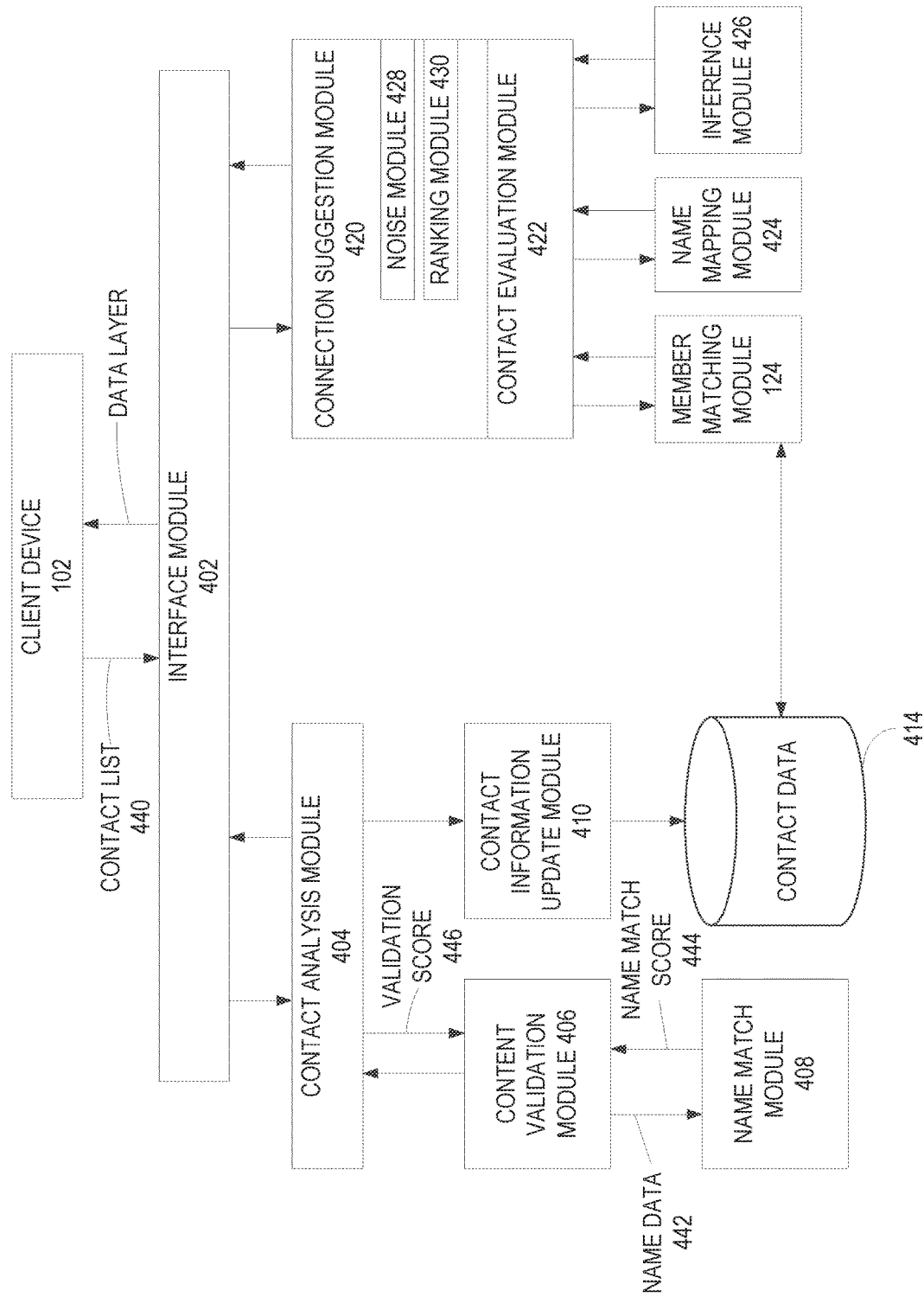
FIG. 4 is a block diagram of a system for storing member contacts and comparing member contacts to existing members to generate one or more lists of members (or guests) who the member may know already, in accordance with some example embodiments.

FIG. 4 is a block diagram of a system for storing member contacts and comparing member contacts to existing members to generate one or more lists of members (or guests) who the member may know already in accordance with some example embodiments. In some example embodiments, the system is depicted as a functional diagram of modules and data stores.

In some example embodiments, a client system 102 transmits a contact list 440 to an interface module 402 associated with the social networking system (e.g., the social networking system 120 in FIG. 1). In some example embodiments, the interface module 402 relays the contact list 440 to a contact analysis module 404 to evaluate the contact list 440 to determine whether the contact list 440 is genuine or part of a malicious or unauthorized attempt to gain access to private information about members of the social networking system (e.g., the social networking system 120 in FIG. 1).

In some example embodiments, the contact analysis module 404 relays the contact list 440 to a content validation module 406. In some example embodiments, the content validation module 406 analyzes the contact list 440 to determine a likelihood that the contact list 440 is part of a malicious attempt to access private information. In some example embodiments, the content validation module 406 transmits name data 442 (e.g., name data included in the contact list 440 and associated with each particular contact) to the name match module 408.

The name match module 408 compares the names associated with each contact with the listed names of existing members. For example, the name match module 408 calculates a Levenshtein distance between the name of the member and the name listed in the contact. The resulting score is a name match score 444 that is returned to the content validation module 406. The content validation module 406 generates a likelihood score 446 for the entire contact list 440, based at least in part on a ratio of the number of contacts whose names match (e.g., are within a predetermined distance from) a stored member profile name and the total number of contacts submitted. In some example embodiments, the likelihood score is a value between 0 and 1 wherein 0 represents no contacts with names that match an existing member profile and 1 represents all the contacts submitted match an existing member profile.

In some example embodiments, the contact analysis module 404 receives the likelihood score 446 from the content validation module 406. If the likelihood score 446 exceeds a predetermined threshold, the contact analysis module 404 transmits the contact list to the contact information update module 410. In some example embodiments, the contact information update module 410 stores the contact list 440 to the contact data 414.

In some example embodiments, the interface module 402 receives a request for a list of potential contacts for a requesting member (e.g., members the requesting member may know). In some example embodiments, the interface module 402 transfers the request, including data identifying the member and the member's contacts, to the connection suggestion module 420.

In some example embodiments, the connection suggest module 420 uses a contact evaluation module 422 to determine which connections to suggest to the member. In some example embodiments, the contact evaluation module 422 uses a member matching module 124 to identify whether or not a contact is a member of the social networking system (e.g., the social networking system 120 in FIG. 1) using the contact data 414. In some example embodiments, the member matching module 124 also identifies the likelihood score 446 associated with each contact.

In some example embodiments, the contact evaluation module 422 uses a name mapping module 424 to identify a member name associated with a phone number in a contact list 440. For example, if a phone number is submitted, the contact evaluation module 422 searches the member profiles to determine whether any member profile lists the submitted phone number. If so, the member name listed in the member profile is identified.

Similarly, an inference module 426 uses a variety of data to determine whether the contact is a member of the social networking system (e.g., the social networking system 120 in FIG. 1) or a guest. For example, the inference module 426 uses a contact data field, such as an e-mail address, to determine whether any existing member profile has a matching email address. In some example embodiments, the inference module 426 can use some or all of the contact data fields to make this determination.

In some example embodiments, the contact evaluation module 422 uses data from the member matching module 124, the name mapping module 424, and/or the inference module 426 to generate a quality score for each contact and to categorize each contact as a guest contact (e.g., contact for someone who is not currently a member of the social networking system (e.g., the social networking system 120 in FIG. 1) or a member. In some example embodiments, generating a quality score includes using the output of the name mapping module 424 and the inference module 426 as weighted values that are combined together to create a quality score. For example, if the output of the name mapping module 424 for a contact is the first factor (f1) and is weighted by a predetermined weight (w1) and the output of the inference module 426 is the second factor (f2) with a predetermined weight (w2). An example formula for the quality score for contact 1 (c1) could be:

$$QS(c1) = f1*w1 + f2*w2$$

In some example embodiments, the determination is a likelihood score based on the percentage of contact data fields that match the data stored in a particular member profile.

In some example embodiments, the connection suggestion module 420 uses a noise module 428 to select (e.g., randomly or pseudo randomly) one or more of the contacts identified as member contacts and represents them as guests to introduce noise into the system. In some example embodiments, a ranking module 430 then ranks the contacts for the first member based on the information associated with the contacts, including but not limited to social graph connections between the first user and the member profile associated with each contact, past contact history between the first user and the member profile with each contact, and so on.

In some example embodiments, the content suggestion module 420 selects, based on rankings by the ranking module 430, a list of member connection suggestions (e.g., connections for people who are current members of the social networking system (e.g., the social networking system 120 in FIG. 1)) and a list of guest connection suggestions (e.g., people who are not current members of the social networking system (e.g., the social networking system 120 in FIG. 1) or members who were selected by the noise module 428 to be displayed as guests). In some example embodiments, the member connection suggestions are selected by choosing a predetermined number of the highest ranked contacts (wherein the contacts are ranked based on social graph connections to a first member and communications between the first member and the member profile associated with the contact). The interface module 402 will send the member connection suggestions and the guest connection suggestions to the client system (e.g., the client system 102 in FIG. 1) for presentation.

Figure 5:
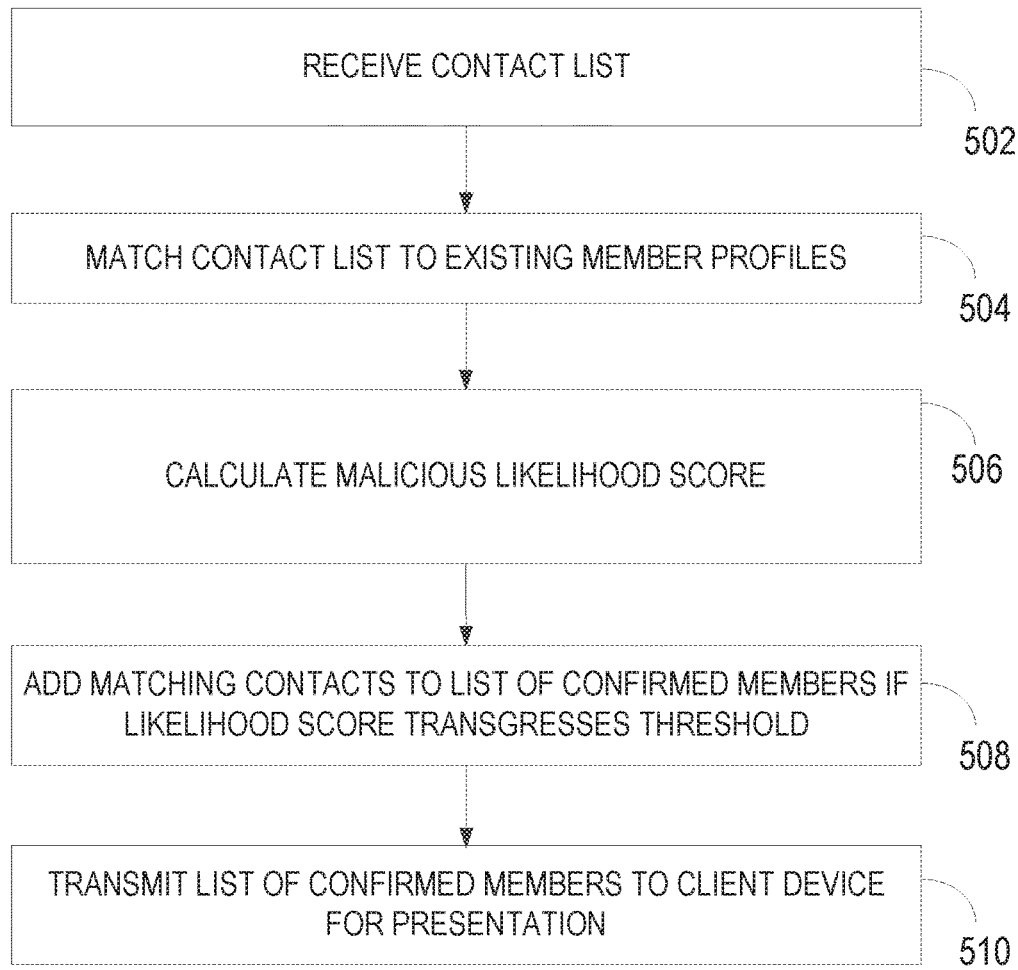
FIG. 5 is a flow diagram illustrating a method, in accordance with some example embodiments, for improving member matching while protecting the privacy of members of a social networking system.

FIG. 5 is a flow diagram illustrating a method, in accordance with some example embodiments, for improving member matching while protecting the privacy of members of a social networking system (e.g., the social networking system 120 in FIG. 1). Each of the operations shown in FIG. 5 may correspond to instructions stored in a computer memory or computer-readable storage medium. In some embodiments, the method described in FIG. 5 is performed by the social networking system (e.g., the social networking system 120 in FIG. 1). However, the method described can also be performed by any other suitable configuration of electronic hardware.

In some embodiments the method is performed by a social networking system (e.g., the social networking system 120 in FIG. 1) including one or more processors and memory storing one or more programs for execution by the one or more processors.

In some example embodiments, the social networking system (e.g., the social networking system 120 in FIG. 1) receives (502) a list of contacts from a first member of the social networking system (e.g., the social networking system 120 in FIG. 1). In some example embodiments, the member is a relatively new member and, as a part of the member onboarding process, the social networking system (e.g., the social networking system 120 in FIG. 1) suggests or requests that the member submit a list of contacts that may be invited to join the first member's social graph. In some example embodiments, the list of contacts comes from an email address book, a phone contact list, a contact list of a networked system, and so on.

In some example embodiments, the contact list includes a plurality of contacts, and each contact includes contact information. In some example embodiments, the contact information includes member-identifiable contact information. As noted above, member-identifiable contact information includes a phone number, an email address, member identification number, address, and so on. In some example embodiments, the social networking system (e.g., the social networking system 120 in FIG. 1) matches (504) the contacts in the contact list to the contact information stored in member profiles. For example, if the contact list includes phone numbers, the social networking system (e.g., the social networking system 120 in FIG. 1) identifies phone numbers in the contact list and compares them to the phone numbers stored in member profiles.

In some example embodiments, for each matching contact (e.g., when a member's contact information matches the member-identifiable contact information from a contact in the list of contacts), the social networking system (e.g., the social networking system 120 in FIG. 1) calculates a malicious likelihood score. In some example embodiments, the malicious likelihood score is a score representing the likelihood that a particular submitted contact or list of contacts is part of a malicious (or otherwise unauthorized) attempt to access private member information. For example, a malicious party may be attempting to bulk harvest the identities of members attached to particular phone numbers or addresses, a party attempting to stalk or access information for a particular member (e.g., find out the phone number of a celebrity), a security researcher (e.g., attempting to identify privacy flaws in the system), or an accidental privacy breach by a mistaken member.

In some example embodiments, the social networking system (e.g., the social networking system 120 in FIG. 1) calculates (506) a malicious likelihood score by a variety of different means. In some example embodiments, the social networking system (e.g., the social networking system 120 in FIG. 1) calculates the percentage of contacts in a given contact list that match a member of the social networking system (e.g., the system 120 in FIG. 1). If the percentage of contacts that match an existing member is below a predetermined threshold (e.g., 50%), the social networking system (e.g., the social networking system 120 in FIG. 1) may determine that the list of contacts is part of a malicious request. In some example embodiments, the social networking system (e.g., the social networking system 120 in FIG. 1) limits the number of failed attempts to match an existing member that a particular member can submit in a given period of time. For example, if a member had 50 submitted contacts that failed to match any existing member in the last 24 hours, the social networking system (e.g., the system 120 in FIG. 1) then blocks that member from submitting additional contacts for the next 24 hours.

In other example embodiments, the social networking system (e.g., the social networking system 120 in FIG. 1) limits the total number of contacts that can be submitted by a member in a given period of time. For example, each member is limited to 500 contacts submitted per day. In some example embodiments, the social networking system (e.g., the social networking system 120 in FIG. 1) restricts the total number of contacts in a contact list that can be submitted by a member at any given time.

In other example embodiments, the social networking system (e.g., the social networking system 120 in FIG. 1) establishes a minimum size of contact list that can be submitted. For example, address lists must have at least five contacts to be matched with existing member profiles.

In some example embodiments, the social networking system (e.g., the social networking system 120 in FIG. 1) uses additional contact information to verify the trustworthiness of the submitted contact or list of contacts. For example, if each contact includes a name, in addition to other member-identifiable information (e.g., a phone number), the social networking system (e.g., the social networking system 120 in FIG. 1) can compare the contact name with the member profile name. Although some contacts will be expected to have names that do not match (or even approximately match, like "mom" or "dad"), if the number of matching names is below a threshold, the social networking system (e.g., the social networking system 120 in FIG. 1) will identify the contact list as potentially malicious.

In some example embodiments, the social networking system (e.g., the social networking system 120 in FIG. 1) will track the contacts submitted from a particular IP address and limit the number of contacts that can be received from a particular IP address. In other example embodiments, the social networking system (e.g., the social networking system 120 in FIG. 1) will use cookies to associate each submitted contact list with a particular computer device. In this case, the social networking system (e.g., the social networking system 120 in FIG. 1) will limit the number of contacts that can be submitted from that computer system.

In some example embodiments, the malicious likelihood score is a value between 0 and 1, with contacts that score low being very likely to be malicious and contacts that score high being less likely to be malicious.

In some example embodiments, the social networking system (e.g., the social networking system 120 in FIG. 1) adds (508) matching member contacts to a list of confirmed member contacts if the contact list has a malicious likelihood score above a predetermined threshold (or below the threshold if high scores are considered malicious). In some example embodiments, the social networking system (e.g., the social networking system 120 in FIG. 1) transmits (510) a list of confirmed member contacts to the client device for presentation. In some example embodiments, the social networking system (e.g., the social networking system 120 in FIG. 1) also transmits a list of guest contacts (e.g., contacts that were not matched to a particular member or who had a malicious likelihood score below the predetermined threshold) on a second page.

In some example embodiments, a member can select a member in the list of confirmed member contacts and the social networking system (e.g., the social networking system 120 in FIG. 1) will transmit an email invitation from the selecting member to the selected member. In some example embodiments, if a member selects a guest member, the invitation to join the social networking system (e.g., the social networking system 120 in FIG. 1) will be sent through the contact details provided by the first member.

In some example embodiments, a member who matches a contact will be displayed as a guest contact. In some example embodiments, the member has opted to not allow their member profile to be matched with submitted contact information. In other example embodiments, the determined malicious likelihood score for a contact or a list of contacts is below a predetermined threshold and thus any matches will be displayed as a suggested guest connection. In yet other example embodiments, a random selection of matching members will be displayed as guests to introduce noise and uncertainty into the system.

In some example embodiments, if the first member opts to invite a matching member who is displayed as a guest, the invitation will be delivered via email. In some example embodiments, the invitation to connect will include the name listed in the contact list when addressing the invited member. For example, if the contact list uses a nickname to represent the contact, that nickname will be used in the invitation.

Figure 6A:
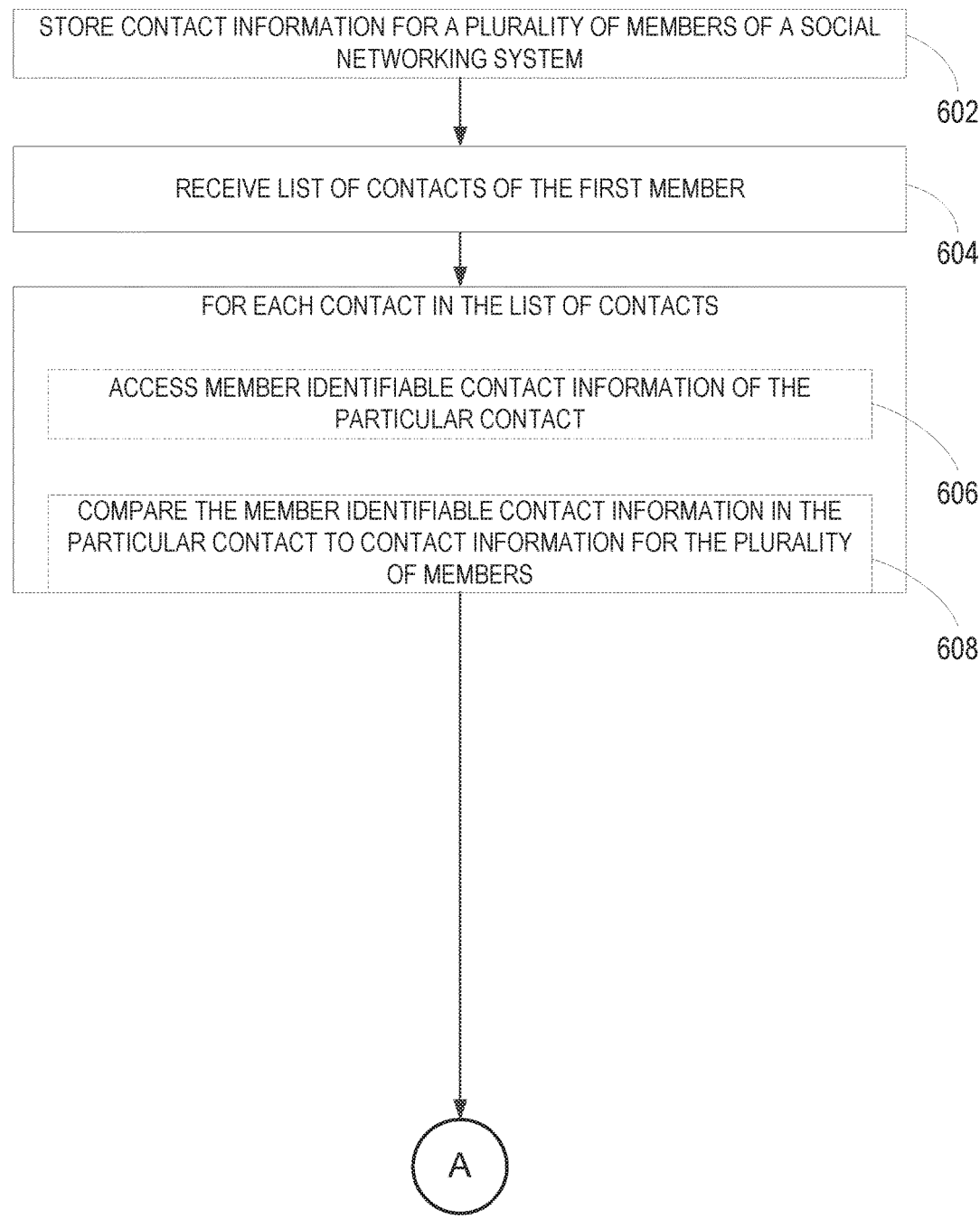
FIGS. 6A-6D is a flow diagram illustrating a method, in accordance with some example embodiments, for identifying potential member and guest contacts while protecting member data privacy at a social networking system.

FIG. 6A is a flow diagram illustrating a method, in accordance with some example embodiments, for identifying potential member and guest contacts while protecting member data privacy at a social networking system (e.g., the social networking system 120 in FIG. 1). Each of the operations shown in FIG. 6A may correspond to instructions stored in a computer memory or computer-readable storage medium. Optional operations are indicated by dashed lines (e.g., boxes with dashed-line borders). In some embodiments, the method described in FIG. 6A is performed by the social networking system (e.g., the social networking system 120 in FIG. 1). However, the method described can also be performed by any other suitable configuration of electronic hardware.

In some embodiments the method is performed by a social networking system (e.g., the social networking system 120 in FIG. 1) including one or more processors and memory storing one or more programs for execution by the one or more processors.

In some example embodiments, a social networking system (e.g., the social networking system 120 in FIG. 1) stores (602) contact information for a plurality of members of a social networking system (e.g., the social networking system 120 in FIG. 1). In some example embodiments, the contact information is received from members. In other example embodiments, the contact information for members is inferred based on information submitted by the social contact of the members.

For example, Member B submits a list of contacts. Within that list of contacts is a contact representing member A. The contact lists the email address, phone number, and name of member A. The social networking system (e.g., the social networking system 120 in FIG. 1) stores a member profile for Member A that includes the email address and name of Member A. Using the email address and name of Member A, the social networking system (e.g., the social networking system 120 in FIG. 1) matches the name and email address in the received contact to the name and email address in the member profile of Member A and, if the two records list the same email address and member name, associates the phone number with Member A.

In some example embodiments, the social networking system (e.g., the social networking system 120 in FIG. 1) receives (604), from a client device associated with a first member, a list of contacts of the first member. For example, a new member may opt to submit a list of their existing contacts (e.g., from a phone number list, an email address book, or other source) in order to quickly grow their social graph on a new service and make connections with other members they already know.

For each contact in the list of contacts, the social networking system (e.g., the social networking system 120 in FIG. 1) accesses (606) member-identifiable contact information of the particular contact. Member-identifiable contact information includes any information that can identify a particular individual (or a group of individuals in the case of a landline phone number in a home). For example, an email address, a member identification number, a phone number, and so on can identify particular individuals.

In some example embodiments, the social networking system (e.g., the social networking system 120 in FIG. 1) compares (608) the member-identifiable contact information in the particular contact to contact information for the plurality of members. For example, if the social networking system (e.g., the social networking system 120 in FIG. 1) identifies an email address in the contact, the social networking system (e.g., the social networking system 120 in FIG. 1) then searches a member profile database to identify any member profiles that list the same email. This search can be performed with any member-identifiable contact information submitted in a contact listing. In some example embodiments, all submitted member-identifiable contact information fields must match a given member profile for the contact listing to be associated with the member profile.

Figure 6B:
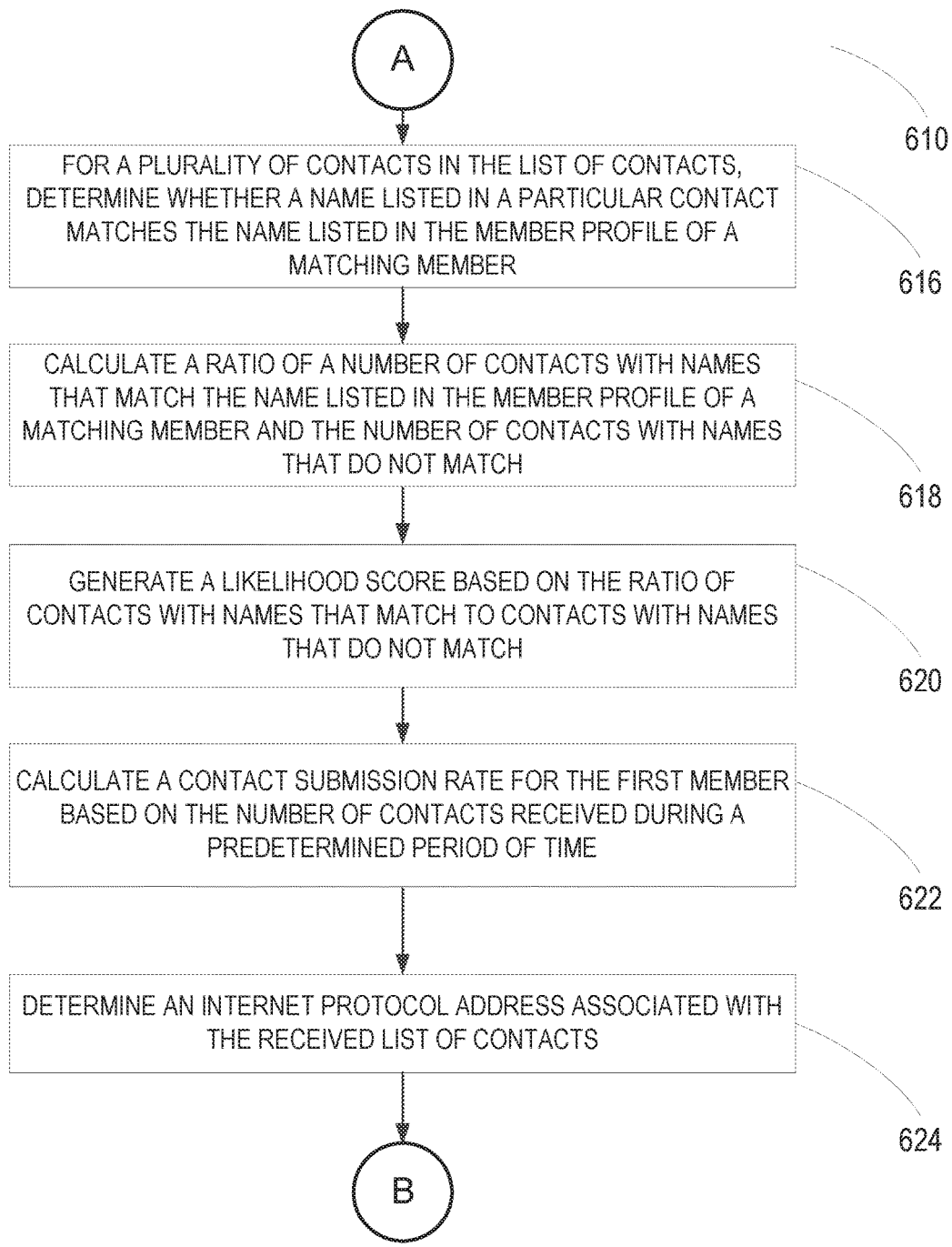

FIG. 6B is a flow diagram illustrating a method, in accordance with some example embodiments, for identifying potential member and guest contacts while protecting member data privacy at a social networking system (e.g., the social networking system 120 in FIG. 1). Each of the operations shown in FIG. 6B may correspond to instructions stored in a computer memory or computer-readable storage medium. Optional operations are indicated by dashed lines (e.g., boxes with dashed-line borders). In some embodiments, the method described in FIG. 6B is performed by the social networking system (e.g., the social networking system 120 in FIG. 1). However, the method described can also be performed by any other suitable configuration of electronic hardware. FIG. 6B continues the method shown in FIG. 6A.

In some embodiments the method is performed by a social networking system (e.g., the social networking system 120 in FIG. 1) including one or more processors and memory storing one or more programs for execution by the one or more processors.

In some example embodiments, generating a malicious likelihood score further comprises a social networking system (e.g., the social networking system 120 in FIG. 1), for a plurality of contacts in the list of contacts, determining (616) whether a name listed in a particular contact matches the name listed in the member profile of a matching member. In some example embodiments, the social networking system (e.g., the social networking system 120 in FIG. 1) calculates a distance between the name listed in the contacts and the name listed in the matching profile. For example, the social networking system (e.g., the social networking system 120 in FIG. 1) can use a Levenshtein distance, which is a measure of the similarity between two strings, and the distance is the number of deletions, insertions, or substitutions used to transform the name in the contact into the name in the profile. If the Levenshtein distance is below a determined threshold (e.g., fewer than four transformation steps needed), the name listed in the contacts is determined to match the name listed in the member profile.

In some example embodiments, the social networking system (e.g., the social networking system 120 in FIG. 1) calculates (618) a ratio of a number of contacts with names that match the name listed in the member profile of a matching member and the number of contacts with names that do not match the name listed in the matching member profile. For example, if 100 contacts are submitted and all but five have names that match within a predetermined range, the ratio of contacts with names that match to contacts with names that do not match would be 95 to 5. Similarly, if 1000 contacts are submitted and only 20 match, the ratio would be much lower, 20 to 980.

In some example embodiments, the social networking system (e.g., the social networking system 120 in FIG. 1) then generates (620) the malicious likelihood score based, at least in part, on the ratio of contacts with names that match to contacts with names that do not match. Thus, contacts that originate from contact lists with a ratio of matching names that exceeds a predetermined threshold ratio (e.g., 705) to non-matching names will result in a higher malicious likelihood score (where high malicious likelihood score indicates genuine or non-malicious contact submission), and contacts that originate from contact lists with a ratio below a predetermined threshold ratio will result in a lower malicious likelihood score, all other things being equal.

In some example embodiments, the social networking system (e.g., the social networking system 120 in FIG. 1) generates a malicious likelihood score, at least in part, by calculating (622) a contact submission rate for the first member based on the number of contacts received during a predetermined period of time. For example, the social networking system (e.g., the social networking system 120 in FIG. 1) calculates the number of submitted contacts during a 24 hour period to calculate a submission rate per day for the member. Contacts that are received from members who submit more than a predetermined threshold of contacts per day will be more likely to receive a low malicious likelihood score. In some example embodiments, the score is a value between 0 and 1, with lower values indicating a higher likelihood of a malicious attempt to access data.

In some example embodiments, the social networking system (e.g., the social networking system 120 in FIG. 1) generates a malicious likelihood score, at least in part, by determining (624) an Internet protocol address associated with the received list of contacts. For example, the contact list submission includes an Internet protocol (IP) address associated with the submission. In some example embodiments, the social networking system (e.g., the social networking system 120 in FIG. 1) stores a database detailing which contacts have been received from which IP address. An IP address associated with a particular list of contacts can be compared to the database of IP addresses. If the associated IP address has been previously associated with malicious attacks, the malicious likelihood score can reflect a higher likelihood of malicious activity.

Figure 6C:
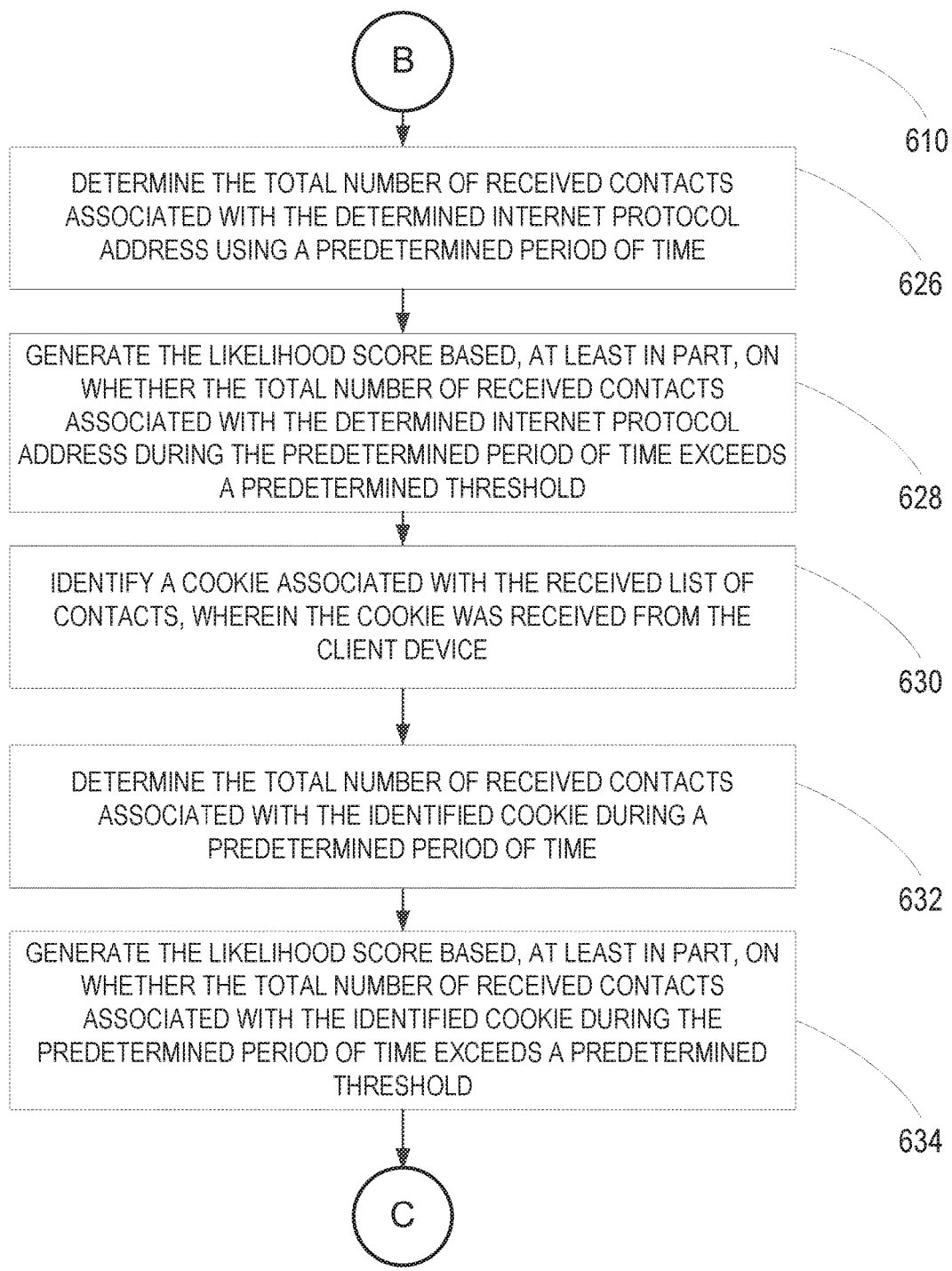

FIG. 6C is a flow diagram illustrating a method, in accordance with some example embodiments, for identifying potential member and guest contacts while protecting member data privacy at a social networking system (e.g., the social networking system 120 in FIG. 1). Each of the operations shown in FIG. 6C may correspond to instructions stored in a computer memory or computer-readable storage medium. Optional operations are indicated by dashed lines (e.g., boxes with dashed-line borders). In some embodiments, the method described in FIG. 6C is performed by the social networking system (e.g., the social networking system 120 in FIG. 1). However, the method described can also be performed by any other suitable configuration of electronic hardware. FIG. 6C continues the method shown in FIGS. 6A-6B.

In some embodiments the method is performed by a social networking system (e.g., the social networking system 120 in FIG. 1) including one or more processors and memory storing one or more programs for execution by the one or more processors.

In some example embodiments, the social networking system (e.g., the social networking system 120 in FIG. 1) determines (626) the total number of received contacts associated with the determined IP address during a predetermined period of time. For example, the social networking system (e.g., the social networking system 120 in FIG. 1) accesses a database that stores each contact and the submission IP address to generate a total number of contacts from a particular IP address.

In some example embodiments, the social networking system (e.g., the social networking system 120 in FIG. 1) generates (628) the malicious likelihood score based, at least in part, on whether the total number of received contacts associated with the determined IP address during the predetermined period of time exceeds a predetermined threshold. In some example embodiments, the malicious likelihood score has both an upper and a lower threshold value. For example, for the number of contacts submitted by a particular IP address, the lower threshold value is 50 and the upper threshold value is 4000. Thus if a particular IP address has below 50 it receives a full score (e.g., 1 if the scale is 0 to 1). The malicious likelihood score is proportionately decreased as the number of contacts increase beyond 50 until the value reaches 4000. For IP addresses that submit over 4000 contacts in a given period of time (e.g., 24 hours), the associated malicious likelihood score is the lowest possible value (e.g., 0 if the scale is 0 to 1).

In some example embodiments, the social networking system (e.g., the social networking system 120 in FIG. 1) identifies (630) a cookie associated with the received list of contacts, wherein the cookie was received from the client device. In some example embodiments, the social networking system (e.g., the social networking system 120 in FIG. 1) determines (632) the total number of received contacts associated with the identified cookie during a predetermined period of time.

In some example embodiments, the social networking system (e.g., the social networking system 120 in FIG. 1) generates (634) the malicious likelihood score based, at least in part, on whether the total number of received contacts associated with the identified cookie during the predetermined period of time exceeds a predetermined threshold.

In some example embodiments, the malicious likelihood score is comprised of one or more factors. Each factor is determined by a particular evaluation or test. As noted above, these factors can include one or more of the number of contacts received in a given time period, the ratio of contacts that match an existing member profile record to the total number of submitted contacts, and the total number of contacts submitted by a particular member, IP address, computing device in a given amount of time. Each of these factors can be compared to a predetermined threshold value to generate a value score for the factor. In some example embodiments, the factors have both an upper and a lower threshold value. For example, for the number of contacts in a list, the lower threshold value is 100 and the upper threshold value is 1000. Thus any contact lists below 100 receive a full score (e.g., 1 if the scale is 0 to 1). The score is proportionately decreased as the number of contacts increase beyond 100 until the value reaches 1000. For contact lists with over 1000 contacts, the associated score is the lowest possible value (e.g., 0 if the scale is 0 to 1).

Each test or factor determines whether submission of a list of contacts is part of a malicious attempt to access protected information. When the malicious likelihood score only uses a single factor or test, then that factor or test makes up the decision as to whether something is malicious. Where an embodiment incorporates multiple factors or tests, then combinatorial logic can be used to combine the outputs of the factors or tests to make the ultimate decision. For example, a malicious intent can be declared if one of the multiple tests indicates a malicious intent. More sophisticated logic can also be used, combining the output of the individual tests in any combination of "AND", "OR" and "NOT" patterns to arrive at the ultimate decision. For example, declare malicious intent if (test 1 OR test 2) AND NOT test 3 declares malicious intent.

Figure 6D:
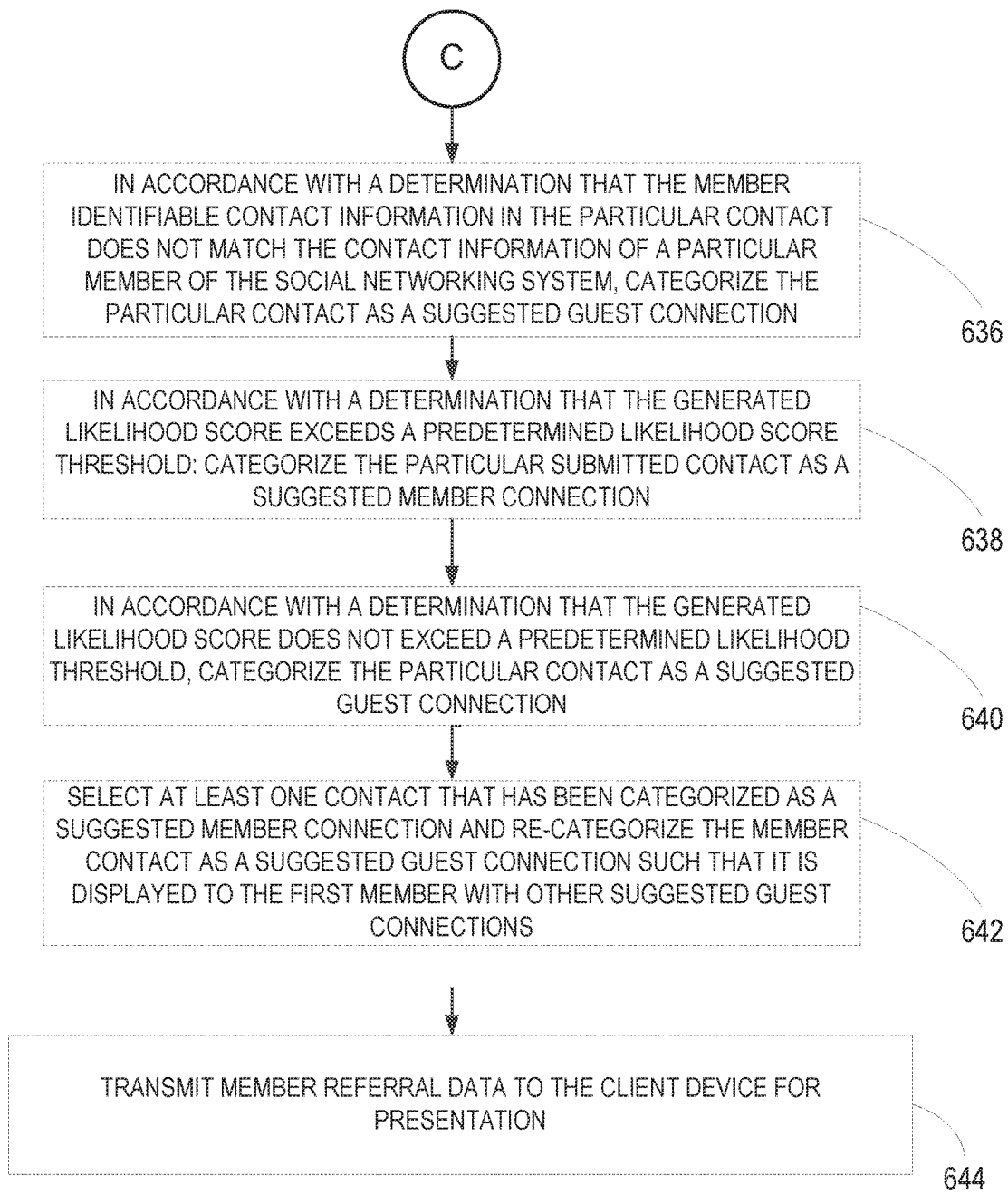

FIG. 6D is a flow diagram illustrating a method, in accordance with some example embodiments, for identifying potential member and guest contacts while protecting member data privacy at a social networking system (e.g., the social networking system 120 in FIG. 1). Each of the operations shown in FIG. 6D may correspond to instructions stored in a computer memory or computer-readable storage medium. Optional operations are indicated by dashed lines (e.g., boxes with dashed-line borders). In some embodiments, the method described in FIG. 6D is performed by the social networking system (e.g., the social networking system 120 in FIG. 1). However, the method described can also be performed by any other suitable configuration of electronic hardware. FIG. 6D continues the method shown in FIGS. 6A-6C.

In some embodiments the method is performed by a social networking system (e.g., the social networking system 120 in FIG. 1) including one or more processors and memory storing one or more programs for execution by the one or more processors.

In some example embodiments, in accordance with a determination that the member-identifiable contact information in the particular contact does not match the contact information of a particular member of the social networking system, the social networking system (e.g., the social networking system 120 in FIG. 1) categorizes (636) the particular contact as a suggested guest connection. Thus, contacts that are determined likely to be unauthorized or malicious will not reveal any private information stored at the social networking system (e.g., the social networking system 120 in FIG. 1).

In accordance with a determination that the generated malicious likelihood score exceeds a predetermined malicious likelihood score threshold, the social networking system (e.g., the social networking system 120 in FIG. 1) categorizes (638) the particular submitted contact as a suggested member connection. Once a submitted contact is categorized as a suggested member connection, the social networking system (e.g., the social networking system 120 in FIG. 1) can use information stored in the member profile (e.g., full name, picture, and so on) to identify the member when sending a suggestion to the submitting member.

In accordance with a determination that the generated malicious likelihood score does not exceed a predetermined malicious likelihood score threshold, the social networking system (e.g., the social networking system 120 in FIG. 1) categorizes (640) the particular contact as a suggested guest connection. In some example embodiments, when a contact is categorized as a guest connection, the transmitted suggestion only includes information already included in the contact. Thus, no additional information is revealed.

In some example embodiments, the social networking system (e.g., the social networking system 120 in FIG. 1) selects (642) at least one contact that has been categorized as a suggested member connection and re-categorizes the member contact as a suggested guest connection such that it is displayed to the first member with other suggested guest connections. In order to ensure that no pattern is apparent of selecting member connections to be re-categorized as a guest connection, the member connections are selected randomly or pseudo-randomly. In this way, there is not a strict correlation between whether the contact matches with a member profile and whether the suggested contact is categorized as a member. This adds noise to a data set and makes it more difficult to reliably extract information from the social networking system (e.g., the social networking system 120 in FIG. 1).

In some example embodiments, the social networking system (e.g., the social networking system 120 in FIG. 1) transmits (644) member referral data to the client device for presentation. In some example embodiments, member referral data includes at least one suggested member connection and at least one suggested guest connection. In some example embodiments, suggested guest connection contacts only include information received from the contact list of the first member.

In this manner, this disclosure provides the ability to use multiple different types of member contact data to suggest member matches while still preserving member privacy.

Software Architecture

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

Figure 7:
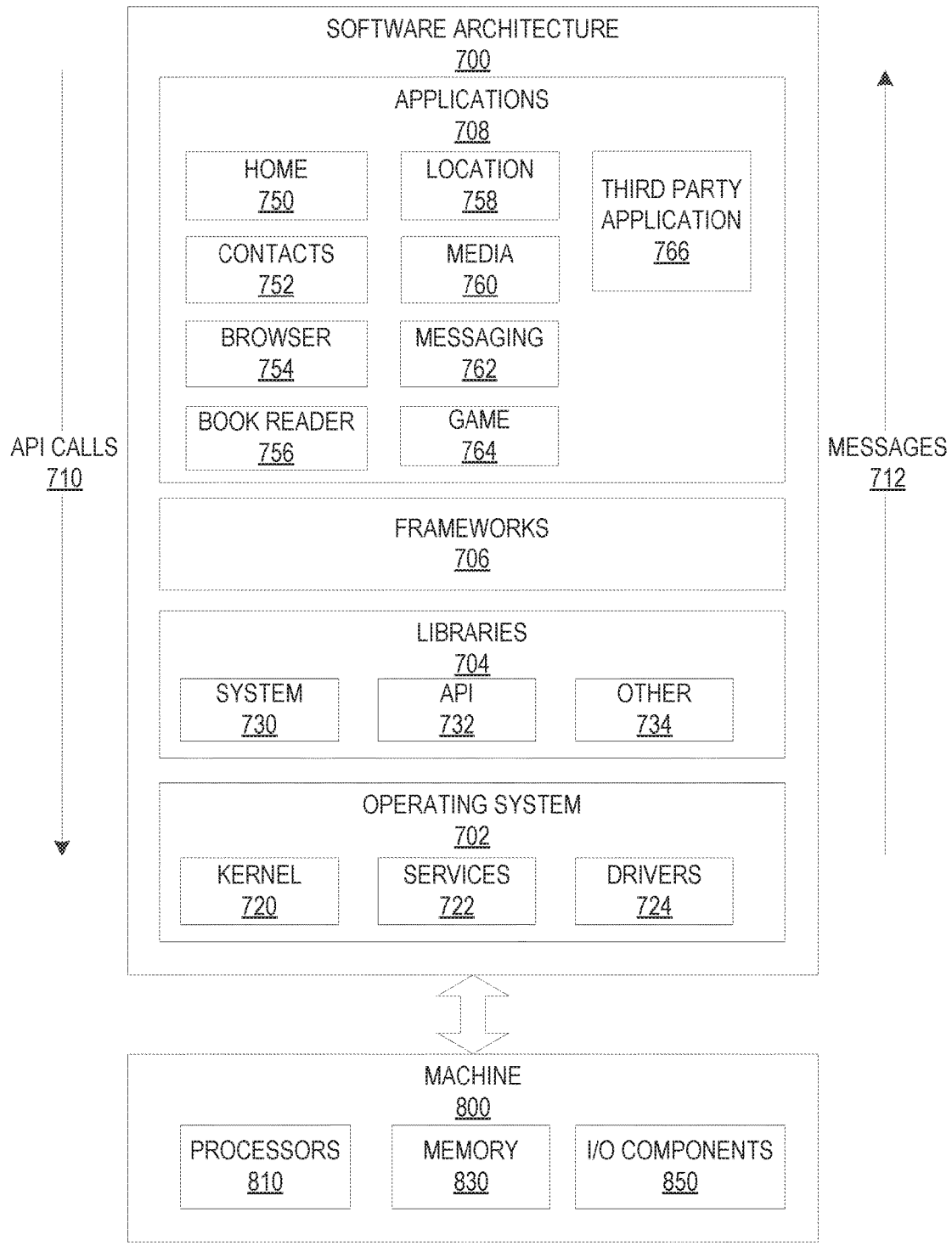
FIG. 7 is a block diagram illustrating an architecture of software, which may be installed on any of one or more devices, in accordance with some example embodiments.

FIG. 7 is a block diagram illustrating an architecture of software 700, which may be installed on any one or more of the devices of FIG. 1. FIG. 7 is merely a non-limiting example of an architecture of software 700 and it will be appreciated that many other architectures may be implemented to facilitate the functionality described herein. The software 700 may be executing on hardware such as a machine 800 of FIG. 8 that includes processors 810, memory 830, and I/O components 850. In the example architecture of FIG. 7, the software 700 may be conceptualized as a stack of layers where each layer may provide particular functionality. For example, the software 700 may include layers such as an operating system 702, libraries 704, frameworks 706, and applications 708. Operationally, the applications 708 may invoke API calls 710 through the software stack and receive messages 712 in response to the API calls 710.

The operating system 702 may manage hardware resources and provide common services. The operating system 702 may include, for example, a kernel 720, services 722, and drivers 724. The kernel 720 may act as an abstraction layer between the hardware and the other software layers. For example, the kernel 720 may be responsible for memory management, processor management (e.g., scheduling), component management, networking, security settings, and so on. The services 722 may provide other common services for the other software layers. The drivers 724 may be responsible for controlling and/or interfacing with the underlying hardware. For instance, the drivers 724 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 704 may provide a low-level common infrastructure that may be utilized by the applications 708. The libraries 704 may include system libraries 730 (e.g., C standard library) that may provide functions such as memory allocation functions, string manipulation functions, mathematic functions, and the like. In addition, the libraries 704 may include API libraries 732 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 704 may also include a wide variety of other libraries 734 to provide many other APIs to the applications 708.

The frameworks 706 may provide a high-level common infrastructure that may be utilized by the applications 708. For example, the frameworks 706 may provide various graphical user interface (GUI) functions, high-level resource management, high-level location services, and so forth. The frameworks 706 may provide a broad spectrum of other APIs that may be utilized by the applications 708, some of which may be specific to a particular operating system 702 or platform.

The applications 708 include a home application 750, a contacts application 752, a browser application 754, a book reader application 756, a location application 758, a media application 760, a messaging application 762, a game application 764, and a broad assortment of other applications, such as a third-party application 766. In a specific example, the third-party application 766 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 766 may invoke the API calls 710 provided by the mobile operating system, such as the operating system 702, to facilitate functionality described herein.

Example Machine Architecture and
Machine-Readable Medium

Figure 8:
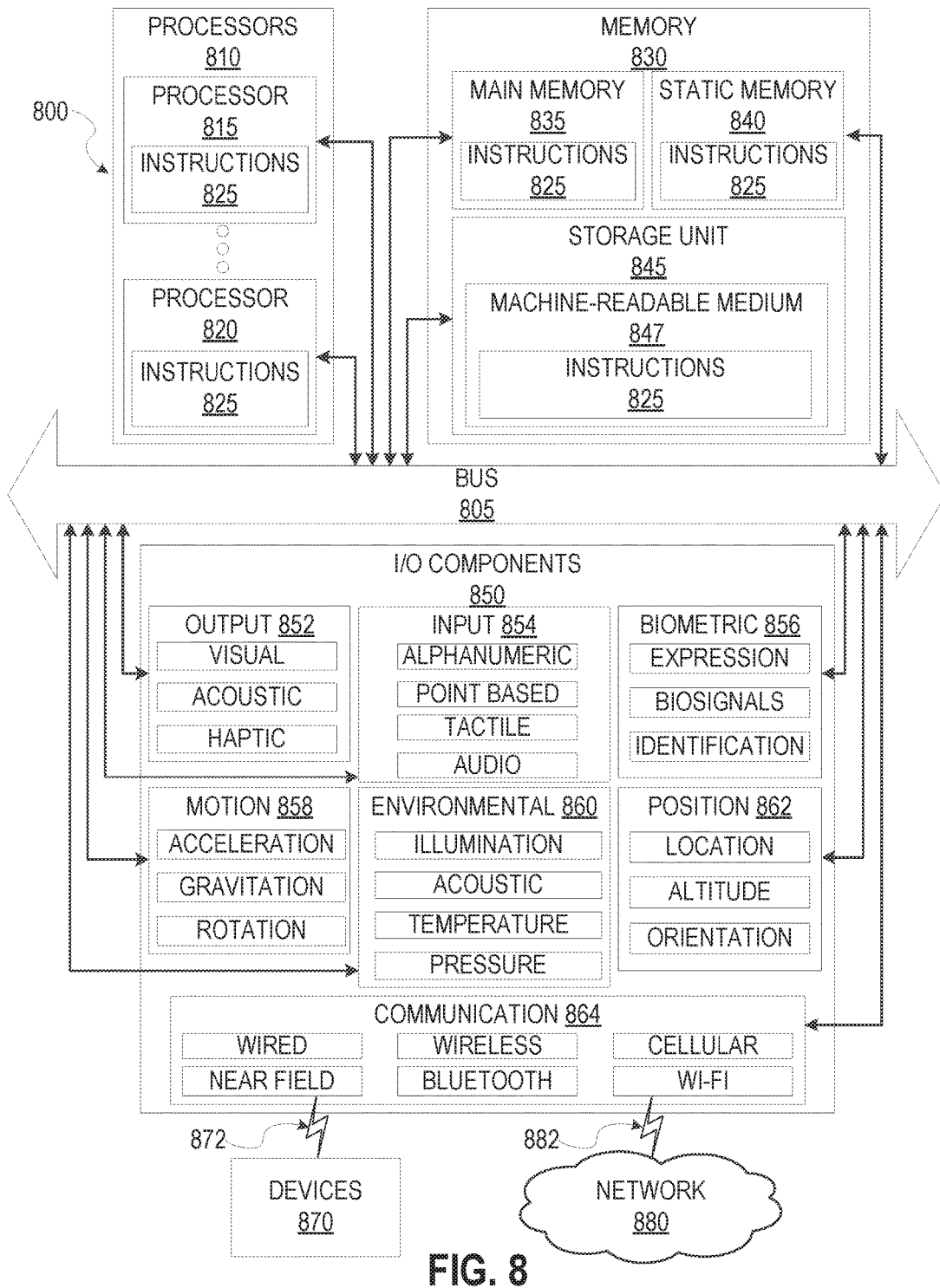
FIG. 8 is a block diagram illustrating components of a machine, according to some example embodiments.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 825 (e.g., software 700, a program, an application, an applet, an app, or other executable code) for causing the machine 800 to perform any one or more of the methodologies discussed herein may be executed. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 825, sequentially or otherwise, that specify actions to be taken by the machine 800. Further, while only a single machine 800 is illustrated, the term "machine" shall also be taken to include a collection of machines 800 that individually or jointly execute the instructions 825 to perform any one or more of the methodologies discussed herein.

The machine 800 may include processors 810, memory 830, and I/O components 850, which may be configured to communicate with each other via a bus 805. In an example embodiment, the processors 810 (e.g., a CPU, a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 815 and a processor 820, which may execute the instructions 825. The term "processor" is intended to include multi-core processors 810 that may comprise two or more independent processors 815, 820 (also referred to as "cores") that may execute the instructions 825 contemporaneously. Although FIG. 8 shows multiple processors 810, the machine 800 may include a single processor 810 with a single core, a single processor 810 with multiple cores (e.g., a multi-core processor), multiple processors 810 with a single core, multiple processors 810 with multiple cores, or any combination thereof.

The memory 830 may include a main memory 835, a static memory 840, and a storage unit 845 accessible to the processors 810 via the bus 805. The storage unit 845 may include a machine-readable medium 847 on which are stored the instructions 825 embodying any one or more of the methodologies or functions described herein. The instructions 825 may also reside, completely or at least partially, within the main memory 835, within the static memory 840, within at least one of the processors 810 (e.g., within the processor's cache memory), or any suitable combination thereof, during execution thereof by the machine 800. Accordingly, the main memory 835, the static memory 840, and the processors 810 may be considered machine-readable media 847.

As used herein, the term "memory" refers to a machine-readable medium 847 able to store data temporarily or permanently and may be taken to include, but not be limited to, random-access memory (RAM), read-only memory (ROM), buffer memory, flash memory, and cache memory. While the machine-readable medium 847 is shown, in an example embodiment, to be a single medium, the term "machine-readable medium" should be taken to include a single medium or multiple media (e.g., a centralized or distributed database, or associated caches and servers) able to store the instructions 825. The term "machine-readable medium" shall also be taken to include any medium, or combination of multiple media, that is capable of storing instructions (e.g., instructions 825) for execution by a machine (e.g., machine 800), such that the instructions 825, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 may include a wide variety of components to receive input, provide and/or produce output, transmit information, exchange information, capture measurements, and so on. It will be appreciated that the I/O components 850 may include many other components that are not shown in FIG. 8. In various example embodiments, the I/O components 850 may include output components 852 and/or input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, and/or other pointing instruments), tactile input components (e.g., a physical button, a touch screen that provides location and force of touches or touch gestures, and/or other tactile input components), audio input components (e.g., a microphone), and the like.

In further example embodiments, the I/O components 850 may include biometric components 856, motion components 858, environmental components 860, and/or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), acoustic sensor components (e.g., one or more microphones that detect background noise), temperature sensor components (e.g., one or more thermometers that detect ambient temperature), humidity sensor components, pressure sensor components (e.g., barometer), proximity sensor components (e.g., infrared sensors that detect nearby objects), and/or other components that may provide indications, measurements, and/or signals corresponding to a surrounding physical environment. The position components 862 may include location sensor components (e.g., a Global Position System (GPS) receiver component), altitude sensor components (e.g., altimeters and/or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 and/or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine 800 and/or any of a wide variety of peripheral devices (e.g., a peripheral device coupled via a USB).

Moreover, the communication components 864 may detect identifiers and/or include components operable to detect identifiers. For example, the communication components 864 may include radio frequency identification (RFID) tag reader components, NFC smart tag detection components, optical reader components (e.g., an optical sensor to detect one-dimensional bar codes such as Universal Product Code (UPC) bar codes, multi-dimensional bar codes such as a Quick Response (QR) code, Aztec code, Data Matrix, Dataglyph, MaxiCode, PDF48, Ultra Code, UCC RSS-2D bar code, and other optical codes), acoustic detection components (e.g., microphones to identify tagged audio signals), and so on. In addition, a variety of information may be derived via the communication components 864, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 880 may be an ad hoc network, an intranet, an extranet, a virtual private network (VPN), a LAN, a wireless LAN (WLAN), a WAN, a wireless WAN (WWAN), a MAN, the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 825 may be transmitted and/or received over the network 880 using a transmission medium via a network interface device (e.g., a network interface component included in the communication components 864) and utilizing any one of a number of well-known transfer protocols (e.g., HTTP). Similarly, the instructions 825 may be transmitted and/or received using a transmission medium via the coupling 872 (e.g., a peer-to-peer coupling) to the devices 870. The term "transmission medium" shall be taken to include any intangible medium that is capable of storing, encoding, or carrying the instructions 825 for execution by the machine 800, and includes digital or analog communications signals or other intangible media to facilitate communication of such software (e.g., software 700).

Furthermore, the machine-readable medium 847 is non-transitory (in other words, not having any transitory signals) in that it does not embody a propagating signal. However, labeling the machine-readable medium 847 as "non-transitory" should not be construed to mean that the medium is incapable of movement; the medium should be considered as being transportable from one physical location to another. Additionally, since the machine-readable medium 847 is tangible, the medium may be considered to be a machine-readable device.

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The invention claimed is:

1. A system comprising:
   a computer-readable memory storing computer-executable instructions that, when executed by one or more hardware processors, configure the system to perform a plurality of operations, the operations comprising:
   storing contact information for a plurality of members of a social networking system;
   receiving, from a client device associated with a first member, a communication representing a request for matching member profiles in the social networking service, the communication including a list of contacts of the first member;
   for a particular contact submitted in the list of contacts:
   accessing member-identifiable contact information of the particular contact;
   comparing the member-identifiable contact information in the particular contact to contact information for the plurality of members; and
   in accordance with a determination that the member-identifiable contact information in the particular contact matches the contact information of a particular member of the social networking system:
   generating a likelihood score that the communication is a legitimate request for matching member profiles, the higher the likelihood score the likelier the communication is a legitimate request while the lower the likelihood score the likelier the communication is a malicious request; and
   in accordance with a determination that the generated likelihood score exceeds a predetermined likelihood score threshold, thus determining that the communication is a legitimate request, causing the following operations to be performed:
   categorizing the particular contact as a suggested member connection; and
   transmitting member referral data to the client device for presentation.

2. The system of claim 1, wherein the operations further comprise:
   in response to a determination that the likelihood score does not transgress the threshold, preventing contacts in the list of contacts from being categorized as suggested member connections.

3. The system of claim 2, wherein member referral data includes at least one suggested member connection and at least one suggested guest connection.

4. The system of claim 1, wherein the likelihood score is further based on a total number of contacts in the list of contacts.

5. The system of claim 1, wherein the likelihood score is further based on a rate at which contacts in the list of contacts have been submitted.

6. The system of claim 1, wherein the likelihood score is further based on a total number of contacts submitted by a single Internet Protocol address.

7. The system of claim 1, wherein the likelihood score is further based on a total rate at which contacts have been submitted by a single Internet Protocol address.

8. A computer-implemented method using at least one computer processor, the method comprising:

storing contact information for a plurality of members of a social networking system;
 receiving, from a client device associated with a first member, a communication representing a request for matching member profiles in the social networking service, the communication including a list of contacts of the first member;
 for a particular contact submitted in the list of contacts:
 accessing member-identifiable contact information of the particular contact;
 comparing the member-identifiable contact information in the particular contact to contact information for the plurality of members; and
 in accordance with a determination that the member-identifiable contact information in the particular contact matches the contact information of a particular member of the social networking system:
 generating a likelihood score that the communication is a legitimate request for matching member profiles, the higher the likelihood score the likelier the communication is a legitimate request while the lower the likelihood score the likelier the communication is a malicious request; and
 in accordance with a determination that the generated likelihood score exceeds a predetermined likelihood score threshold, thus determining that the communication is a legitimate request, causing the following operations to be performed:
 categorizing the particular contact as a suggested member connection; and
 transmitting member referral data to the client device for presentation.

9. The method of claim 8, further comprising:

in response to a determination that the likelihood score does not transgress the threshold, preventing contacts in the list of contacts from being categorized as suggested member connections.

10. The method of claim 9, wherein member referral data includes at least one suggested member connection and at least one suggested guest connection.

11. The method of claim 8, wherein the likelihood score is further based on a total number of contacts in the list of contacts.

12. The method of claim 8, wherein the likelihood score is further based on a rate at which contacts in the list of contacts have been submitted.

13. The method of claim 8, wherein the likelihood score is further based on a total number of contacts submitted by a single Internet Protocol address.

14. The method of claim 8, wherein the likelihood score is further based on a total rate at which contacts have been submitted by a single Internet Protocol address.

15. A non-transitory computer-readable storage medium storing instructions that, when executed by the one or more processors of a machine, cause the machine to perform operations comprising:

storing contact information for a plurality of members of a social networking system;
 receiving, from a client device associated with a first member, a communication representing a request for matching member profiles in the social networking service, the communication including a list of contacts of the first member;
 for a particular contact submitted in the list of contacts:
 accessing member-identifiable contact information of the particular contact;
 comparing the member-identifiable contact information in the particular contact to contact information for the plurality of members; and
 in accordance with a determination that the member-identifiable contact information in the particular contact matches the contact information of a particular member of the social networking system:
 generating a likelihood score that the communication is a legitimate request for matching member profiles, the higher the likelihood score the likelier the communication is a legitimate request while the lower the likelihood score the likelier the communication is a malicious request; and
 in accordance with a determination that the generated likelihood score exceeds a predetermined likelihood score threshold, thus determining that the communication is a legitimate request, causing the following operations to be performed:
 categorizing the particular contact as a suggested member connection; and
 transmitting member referral data to the client device for presentation.

16. The non-transitory computer-readable storage medium of claim 15, further comprising:

in response to a determination that the likelihood score does not transgress the threshold, preventing contacts in the list of contacts from being categorized as suggested member connections.

17. The non-transitory computer-readable storage medium of claim 16, wherein member referral data includes at least one suggested member connection and at least one suggested guest connection.

18. The non-transitory computer-readable storage medium of claim 15, wherein the likelihood score is further based on a total number of contacts in the list of contacts.

19. The non-transitory computer-readable storage medium of claim 15, wherein the likelihood score is further based on a rate at which contacts in the list of contacts have been submitted.

20. The non-transitory computer-readable storage medium of claim 15, wherein the likelihood score is further based on a total number of contacts submitted by a single Internet Protocol address.

* * * * *